(12) United States Patent
Lee

(10) Patent No.: US 9,942,395 B2
(45) Date of Patent: *Apr. 10, 2018

(54) NETWORK-BASED SOCIAL TELEPHONY FIREWALL

(71) Applicant: AT&T Intellectual Property I, L.P., Atlanta, GA (US)

(72) Inventor: Brian Lee, Plainfield, IL (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/430,743

(22) Filed: Feb. 13, 2017

(65) Prior Publication Data

US 2017/0171388 A1   Jun. 15, 2017

Related U.S. Application Data

(63) Continuation of application No. 14/875,209, filed on Oct. 5, 2015, now Pat. No. 9,571,642, which is a continuation of application No. 14/054,142, filed on Oct. 15, 2013, now Pat. No. 9,154,621.

(51) Int. Cl.
*H04M 3/42* (2006.01)
*H04M 3/436* (2006.01)
*G06Q 30/02* (2012.01)

(52) U.S. Cl.
CPC ........ *H04M 3/436* (2013.01); *G06Q 30/0207* (2013.01); *H04M 3/42042* (2013.01); *H04M 3/42153* (2013.01); *H04M 2203/2038* (2013.01)

(58) Field of Classification Search
CPC ......... H04M 3/436; H04M 1/663; H04M 1/66
USPC ............ 379/142.01, 201.02, 114.22, 114.13, 379/207.02, 210.02, 211.01, 201.01, 379/88.16, 266.07, 112.04; 370/230, 259
See application file for complete search history.

(56) References Cited

U.S. PATENT DOCUMENTS

| | | | |
|---|---|---|---|
| 6,519,332 B1 | 2/2003 | Tovander | |
| 6,650,742 B1 | 11/2003 | Elliot et al. | |
| 7,197,120 B2 | 3/2007 | Luehrig | |
| 8,005,074 B2 | 8/2011 | Tartarelli et al. | |
| 8,141,133 B2 | 3/2012 | Pagan | |
| 8,270,588 B2 | 9/2012 | Schwartz | |
| 8,300,798 B1 * | 10/2012 | Wu | H04M 3/5233 379/265.11 |
| 8,363,803 B2 | 1/2013 | Gupta | |
| 8,406,410 B2 | 3/2013 | Kirkpatrick | |
| 8,488,479 B2 | 7/2013 | Li et al. | |
| 8,494,144 B2 | 7/2013 | Hodge | |
| 8,515,034 B2 | 8/2013 | McFeeters | |
| 2004/0071281 A1 | 4/2004 | Rashid | |
| 2005/0271196 A1 | 12/2005 | Florkey et al. | |
| 2006/0036487 A1 | 2/2006 | Mann | |
| 2006/0093111 A1 | 5/2006 | Peck | |
| 2006/0182029 A1 | 8/2006 | Kealy et al. | |
| 2007/0201650 A1 | 8/2007 | Mastro | |

(Continued)

*Primary Examiner* — Thjuan K Addy

(57) ABSTRACT

A method receives a call from a device of a caller destined to a device of a subscriber of a communication network. The method connects the call to the device of the subscriber and then receives from the device of the subscriber an indication that the call is an undesirable call. The indication further includes a description of the call. The method then provides a reward to the subscriber when the indication further includes the description of the call.

20 Claims, 5 Drawing Sheets

(56) References Cited

U.S. PATENT DOCUMENTS

| | | |
|---|---|---|
| 2008/0152111 A1 | 6/2008 | Mock et al. |
| 2010/0158215 A1 | 6/2010 | Dhawan |
| 2010/0172482 A1 | 7/2010 | Fotta |
| 2010/0183139 A1 | 7/2010 | McNamara et al. |
| 2014/0177479 A1 | 6/2014 | Cook |

* cited by examiner

NETWORK-BASED SOCIAL TELEPHONY FIREWALL

This application is a continuation of U.S. patent application Ser. No. 14/875,209, filed Oct. 5, 2015, now U.S. Pat. No. 9,571,642, which is a continuation of U.S. patent application Ser. No. 14/054,142, filed Oct. 15, 2013, now U.S. Pat. No. 9,154,621, all of which are herein incorporated by reference in their entirety.

The present disclosure relates generally to communication networks and, more particularly, to detecting and preventing calls from unwanted callers using feedback from subscribers.

BACKGROUND

Unwanted or undesirable calls present a particular problem for many network subscribers as well as for the communication network infrastructure. For example, telemarketers, survey outfits, charities, political groups and others may continually place calls to large numbers of subscribers. Many times the callers are deemed to be pushy or aggressive by the recipients of such calls. In addition, many entities continue to place calls to the same subscriber despite having been asked to stop calling. In some cases, these unwanted calls result in usage charges to a subscriber, further adding to the subscriber's frustration. There are schemes in place to address these problems. For example, with respect to cellular networks, current Federal Communication Commission (FCC) regulations do not permit telemarketers to use auto dialers to place calls to mobile phones. However, many subscribers report that such calls are still being received. Aggressive telemarketers also benefit from the increased deployment and availability of Voice over Internet Protocol (VoIP) equipment and services. For example, a telemarketer may use a VoIP based auto dialer to place large numbers of calls over the Internet. The telemarketer may change locations and equipment often enough to effectively avoid meaningful detection and countermeasures. Do-not-call registries/lists exist in many jurisdictions. However, subscribers often report that certain callers are ignoring the do-not-call list(s). In addition, certain callers are exempt from complying with do-not-call laws and regulations, e.g., political callers, charities and local businesses.

SUMMARY

In one embodiment, the present disclosure describes a method for processing a call. For example, the method receives the call from a device of a caller destined to a device of a subscriber of a communication network. The method connects the call to the device of the subscriber and then receives from the device of the subscriber an indication that the call is an undesirable call. The indication further includes a description of the call. The method then provides a reward to the subscriber when the indication further includes the description of the call.

In another embodiment, the present disclosure describes a method for filtering a call. For example, the method receives the call from a device of a caller destined to a device of a subscriber of a communication network and retrieves a profile of the subscriber. The profile specifies a threshold for filtering the call from the device of the caller. The threshold is determined by the subscriber and comprises a level of tagging, by other subscribers of the communication network, associated with a source identifier of the device of the caller being identified as a source of an undesirable call. The method then determines the source identifier of the device of the subscriber satisfies the threshold. When the threshold is satisfied, the method filters the call according to the profile of the subscriber.

In still another embodiment, the present disclosure describes a further method for processing a call. For example, the method receives the call from a device of a caller via a communication network. The method then obtains from the subscriber an indication that the call is an undesirable call. The indication further includes a description of the call. The method then transmits to the communication network the indication that includes the description of the call and receives from the communication network a notification of a reward to the subscriber in response to the transmitting to the communication network the indication that includes the description of the call.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
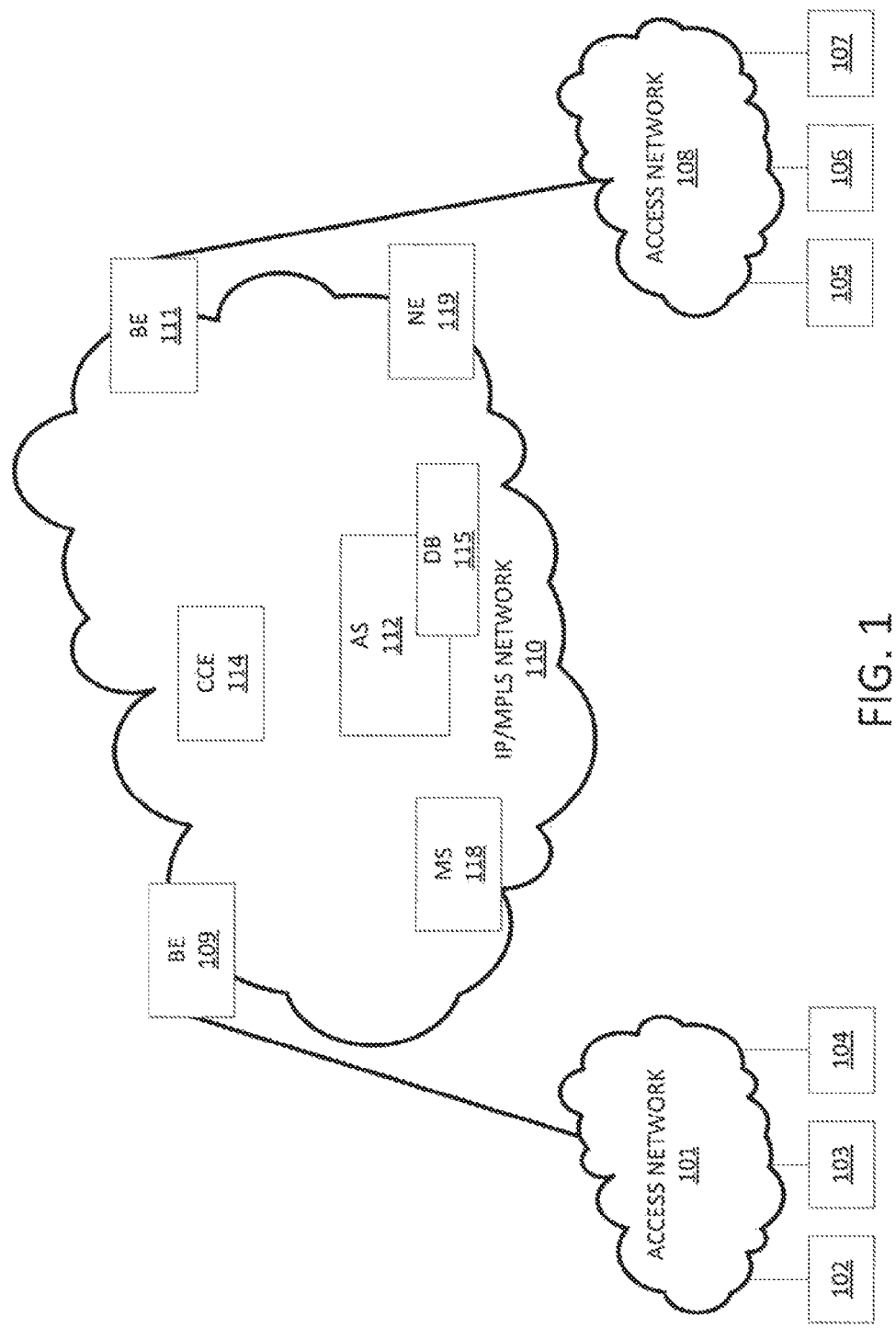
FIG. 1 illustrates an exemplary network related to the present disclosure.

The present disclosure describes social telephony firewall devices, methods and computer-readable media that leverage a subscriber base of a communications network and/or contacts of a subscriber to identify sources of undesirable calls and to filter calls from these sources for alternative call handling. For example, after a call, a subscriber may be prompted by his or her endpoint device or by the network to engage a tagging service for tagging the call as an undesirable call. In one embodiment, the subscriber may then be additionally prompted to further categorize the call. For example, the subscriber may provide a description of the call, e.g., the type of call, the purpose of the call and/or characteristics of the caller. A description of the type of call may comprise: an automated call, a sales call, a fundraiser call, a political call, a telemarketer call, a survey call, etc. A description of the purpose of the call may relate to the subject of the call, e.g., a particular product or service (e.g., insurance sales, timeshare sales, car sales, telecommunications service sales and the like), political advocating, political fundraising, a survey about television programming, a survey about public transportation services, etc. Characteristics of the caller may describe the attitude or manner of the caller, e.g., whether the caller was aggressive, impolite, rude and so forth. A description of a characteristic of the caller may further include a scale for the subscriber to rank the characteristic of the caller (e.g., 1 to 10, where 1 is not at all abusive and 10 is most abusive, etc.). The user may select from choices using a touchpad, or be engaged through an interactive voice response (IVR) system either on the subscriber's endpoint device or hosted in the network. In one example, after the subscriber provides an initial description of the call, the subscriber may also be prompted to provide more detailed information regarding the call. For instance, if the subscriber first identifies a call as a sales call (e.g., a type of call), the subscriber may be prompted to provide further indication that the call related to a car sales offer, a restaurant discount offer, an insurance offer, etc. (e.g., a purpose of the call).

When a particular caller has been tagged by a threshold number of times by different subscribers, the caller may then be filtered, e.g., blocked, warned, throttled, etc. In one example, subsequent calls from the caller to a subscriber may be given a different call handling, e.g., sending the call automatically to a subscriber's voicemail with an introductory recording that indicates the call was flagged as being from an undesirable caller. It should be noted that the subscribers may tag calls, which are then aggregated by source identifiers of the devices of the callers. For example, the device of the caller may be identified across different calls based upon one or more different source identifiers, including: a telephone number, a mobile equipment identifier (MEID), an International Mobile Equipment Identity (IMEI) number, an Internet Protocol (IP) address, a Session Initiation Protocol (SIP) address or other device identifier.

The subscriber receiving the call may not actually be aware of one or more of the source identifiers of the device of the caller. For instance, the subscriber typically would not know the IMEI number of the caller's device. In addition, the caller may have caller identification (ID) blocking activated. However, these source identifiers are typically more readily available to the network provider. Thus, from the perspective of a subscriber, the subscriber may simply tag a call. From the perspective of the network, the same tag may relate to both the call as well as the calling device (e.g., as determined by the source identifier) or the caller. The network will aggregate subscriber's tags of incoming calls by source identifiers of the devices of callers. Thus, the present disclosure may interchangeably refer to tagging a call, tagging a device of a caller, tagging a caller, or tagging a source identifier of a caller.

In one example, the threshold for filtering a caller is based not upon exceeding a raw number of tags, but is based upon a rate at which calls from the caller are tagged, e.g., 100 tags per week, etc. The network may maintain counts, or scores regarding a level of tagging for any calling device that has been tagged at least once as being a source of an undesirable call. The method may also store other information in connection with calling devices, including counts of the number of subscribers who have indicated that the caller is of a particular category, average scores of the caller on various characteristics scales, e.g., an average ranking of 9 out of 10 on an abusiveness scale as ranked by subscribers who have given feedback regarding the caller, and so forth.

In one example, the network sets default settings for subscribers of the social telephony firewall service. For instance, the network may set a threshold to block calls from callers that have been tagged 100 times or more. Each subscriber may then modify the default settings, e.g., a subscriber can request that calls be blocked from all callers that have been tagged only 50 times. In another example, a subscriber may set his/her personal preferences such that all calls from callers that have exceeded a particular tagging threshold for a particular category (e.g., insurance sales) should be blocked. On the other hand, another subscriber may allow such callers if the subscriber does not object to such callers even when such callers have exceeded the tagging threshold. For example, the subscriber may currently be shopping for insurance and may temporarily welcome receiving insurance sales calls. A different subscriber may desire to allow all sales calls except for calls from callers who have been tagged as abusive more than a threshold number of times. Subscribers may also vary their configurations depending upon the time of day, e.g., using a lower threshold for blocking callers during business hours and using a higher threshold for other times, e.g., after 5:00 pm.

As an incentive to subscribers to participate and to provide further levels of detail regarding undesirable calls, the network may provide rewards to a subscriber based upon the number of tags of undesirable calls provided by the subscriber. For example, a subscriber may tag a call as an undesirable call. In addition, the subscriber may further provide a description of the call that indicates the type of call, the purpose of the call and/or characteristics of the caller. For instance, the subscriber may indicate that the call is a sales call, that the caller ranked as 7 out of 10 in terms of rudeness, and so forth. For instance, the subscriber may choose between a number of predefined choices provided by the network for categorizing the call. The subscriber may be given a reward, or a greater reward as compared to if the subscriber simply tagged the call as an undesirable call and did not provide the additional description(s) regarding the call. For example, the network may provide credits to the subscriber's account, subsidize the social telephony firewall service to a greater degree for the subscriber, offer redeemable rewards points, and so forth.

As further incentive, or simply as feature of the social telephony firewall service, in one example the tags of subscribers with a greater level of participation and who provide greater level of detail may be afforded greater weight in calculating a level of tagging of a caller. For instance, if a subscriber consistently provides extra information (i.e., more detailed descriptions) regarding tagged calls/callers, the subscriber's tags may be given greater weight in calculating a tagging score of the caller. Such subscribers may be deemed to be "valued" tagging subscribers or "trusted" tagging subscribers. For example, a default threshold for a caller being tagged as a source of undesirable calls may be "100". When a subscriber deemed to have a high level of participation tags a particular caller, the subscriber's tag may count twice or 1.5 times towards meeting this threshold, whereas a tag from a subscriber who only tags calls without provide further description and further details may have his or her tag be counted at face value, e.g., 1, or even at a discounted weight e.g., 0.75. Thresholds for determining when a subscriber is considered to be a "valued tagging subscriber" may be set by the network. Similarly, the relative weighting to apply to the tagging of different categories of subscriber may also be set by the network.

To aid in understanding the present disclosure, FIG. 1 illustrates a block diagram of an exemplary communication system 100, constructed in accordance with one or more aspects of the disclosure. The present disclosure may be embodied as a network-based server hosting and/or executing a social telephony firewall service to process incoming calls, e.g., call setup/signaling messages, to perform filtering of the incoming calls prior to forwarding to subscriber devices, and to aggregate and store tagging information provided by various subscribers regarding sources of undesirable calls, and to perform other functions described above. For example, the present disclosure may comprise a software tool that is deployed on an application server, a call control element, a border element or other network-based device or server. Although the present disclosure is discussed below in the context of exemplary access networks and an Internet Protocol/Multi-Protocol Label Switching (IP/MPLS) core network, the present disclosure is not so limited. Namely, the present disclosure can be applied to communication networks in general, e.g., cellular networks, Internet Protocol (IP) Multimedia Subsystem (IMS) networks, asynchronous transfer mode (ATM) networks, and the like, or any other network suitable for voice telephony.

As illustrated in FIG. 1, endpoint devices 102-107 are configured for communication with the network 110 (e.g., an IP/MPLS core backbone network, supported by a service provider) via access networks 101 and 108. The endpoint devices 102-107 may comprise wired and wireless phones, cellular phones, terminal adapters, personal computers, laptop computers, personal digital assistants (PDAs), servers, and the like. In one embodiment, any one or more of endpoint devices 102-107 may comprise a subscriber device (e.g., a device of a subscriber of network 110) or may comprise a device of a user whose communications will be carried via the network 110 (e.g., a non-subscriber). The access networks 101 and 108 serve as a conduit to establish a connection between the endpoint devices 102-107 and the border elements (BEs) 109 and 111 of the core network 110. The access networks 101, 108 may each comprise a digital subscriber line (DSL) network, a broadband cable access network, a local area network (LAN), a wireless access network (WAN), a cellular/mobile network, a wireless fidelity (Wi-Fi) network, the Internet, and the like.

BEs 109 and 111 are network elements which reside at the edge of the core infrastructure and interface with endpoint devices for signaling and routing purposes over various types of access networks. A BE is typically configured to serve as an edge router, a media gateway, a firewall, and the like. Network 110 may also include a call control element (CCE) 114, a media server (MS) 118 and other network elements, e.g., NE 119, which may comprise a voicemail server, a honeypot, a tarpit, or other network component. The CCE 114 is typically implemented as a media gateway controller or a softswitch and performs network wide call control related functions as well as interacts with the appropriate service related servers, when necessary. The CCE 114 functions as a session initiation protocol (SIP) back-to-back user agent and is a signaling endpoint for all call legs between all BEs and the CCE 114. Media server 118 typically handles and terminates media streams, and provides services such as announcements, bridges, transcoding, and Interactive Voice Response (IVR) messages.

Figure 5:
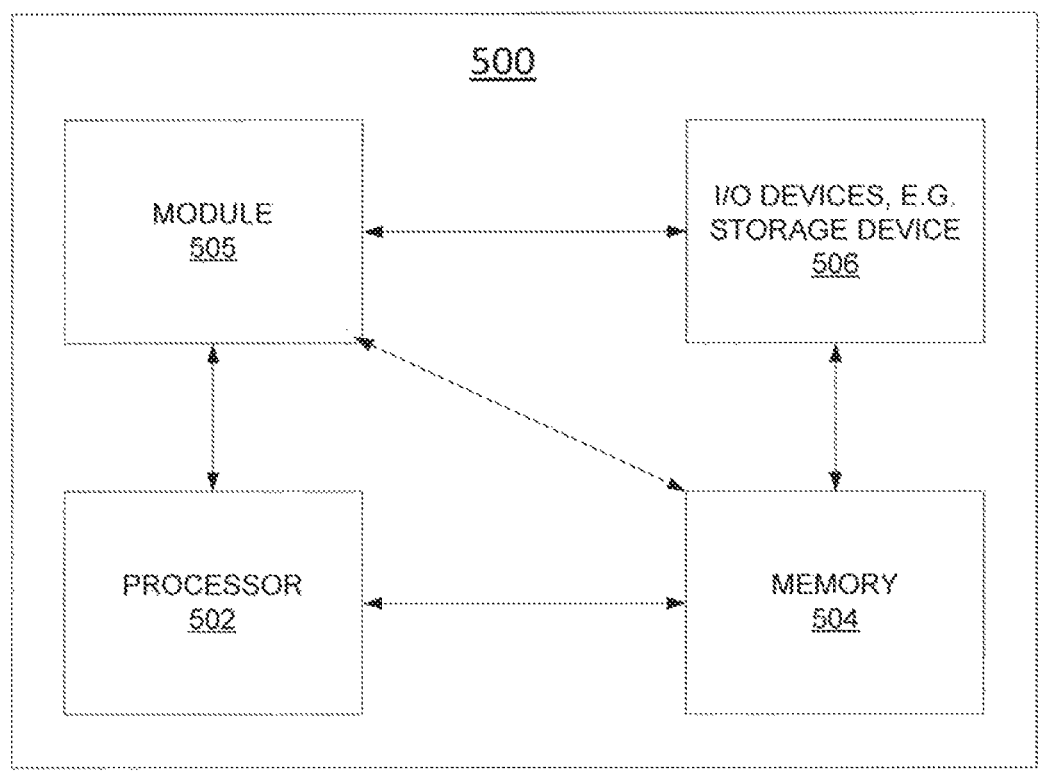
FIG. 5 illustrates a high-level block diagram of a general-purpose computer suitable for use in performing the functions, methods and algorithms described herein.

Network 110 may also comprise an application server (AS) 112 that contains a database 115. The application server 112 may comprise any server or computer that is well known in the art, and the database 115 may be any type of electronic collection of data that is well known in the art. For example, AS 112 and DB 115 may be implemented as a computing device such as illustrated in FIG. 5 and described below. In one embodiment, AS 112 may store and retrieve subscriber profiles from DB 115, e.g., preferences and filtering rules regarding handling of undesirable calls in accordance with the present disclosure. AS 112/DB 115 may also collect, gather and store information on the tagging of callers and/or the devices of such callers as sources of undesirable calls. In other words, AS 112/DB 115 may provide various aspects of a social telephony firewall service in accordance with the present disclosure.

In one example, if the network 110 receives a call towards the endpoint device 102 (e.g., a subscriber device) from endpoint device 105 (e.g., a calling endpoint device), the call control element (CCE) 114 may receive the signaling message to setup the call. For example, if a call is originated by the endpoint device 105 towards the endpoint device 102, the CCE 114 may receive a setup message, e.g., SIP signaling message, for setting up the call. Typically, the CCE 114 determines the routing logic for the destination address and forwards the signaling message towards the appropriate signaling gateway router serving the called party destination (in this case BE 109), as part of the normal process of establishing a call via network 110.

In accordance with the present disclosure, the CCE 114 may communicate with AS 112 to determine the routing logic for handling the call. For instance, AS 112 may retrieve information stored in DB 115 regarding the subscriber preferences of the subscriber associated with the called endpoint device 102. AS 112 may also retrieve information stored in DB 115 regarding tagging of the calling endpoint device, e.g., based upon information in the call setup signaling message from CCE 114. For example, AS 112 may look up the calling endpoint device 105, in the database and retrieve information regarding a level of tagging of the calling endpoint device/caller as a source of undesirable calls. The calling endpoint device may be referenced by any of the above described source identifiers such as a telephone number, IMEI number, etc. If a record exists for the caller/calling endpoint device, AS 112 may then apply the call the filtering rule(s) contained in the subscriber profile of the subscriber of endpoint device 102.

If the call does not match one of the filtering rules, then AS 112 may indicate to the CCE 114 that the call setup signaling message should be forwarded to BE 109 for normal call processing. On the other hand, if the caller/endpoint device 105 matches one of the filtering rules, then the AS 112 may provide call routing logic for the CCE to filter the call and/or to perform alternative call handling, as directed by the filtering rule of the subscriber. For example, the CCE 114 may be provided with routing logic to drop or block the call, to provide a message back to the endpoint device 105 indicating that the call has been blocked, to forward the call to a voicemail server, e.g., NE 119, for the caller to leave a message for the subscriber of endpoint device 102, and so forth.

In one embodiment, the application server 112 may also receive tag information from subscriber devices (e.g., any one or more of endpoint devices 102-107) via the border elements 109 and 111. In another embodiment, the border elements 109 and 111 may periodically upload aggregate tagging information to the application server 112 and/or the database 115. In particular, at the end of a call, a subscriber may tag the call as an undesirable call, and may provide a further description regarding the call, e.g., a type of call, a purpose of the call and/or characteristics of the caller. The subscriber may provide such Information on his or her own initiative, or may be prompted by the subscriber's device and/or by a network element of network 110. For example, the caller may press a predefined series of keys (e.g., *99) at the end of the call to indicate that the caller is tagging the call as an undesirable call. The caller may then have the opportunity to provide the further information regarding the call/caller. For instance, BE 109 may recognize the predefined tone sequence as a request to tag the call. The BE 109 may signal to CCE 114 that a session should be established between endpoint device 102 and AS 112 to allow the subscriber to provide a further description of the call. In one example, the session may include MS 118, e.g., to engage the subscriber in an IVR dialog to solicit further information from the subscriber.

Regardless of the manner in which AS 112 comes to possess such tagging information and call descriptions from the subscribers, the responses of the subscribers may then be stored in DB 115. In particular, if a call is tagged, the AS 112 may aggregate the tag with any other previous tags regarding the same calling endpoint device/caller. Any new or updated information regarding the caller/calling endpoint device may then be used by AS 112 in conjunction with subscribers' profiles/filtering rules to determine how to handle future calls from the calling endpoint device to any other subscribers of network 110. In addition, subscribers may interact with AS 112 to update, modify or change their preferences, e.g., filter rules contained in subscriber profiles regarding the preferred handling of undesirable calls. For example, subscribers may access AS 112 over a web interface, via a personal computer, using a dial-in IVR system or other automated response system (e.g., implemented by MS 118), and so forth.

The above IP network is described only to provide an illustrative environment in which voice, data and video packets can be transmitted on communication networks and in which various embodiments of the present disclosure may be employed. Thus, those skilled in the art will realize that although only six endpoint devices, two access networks, and five network elements (NEs) are depicted in FIG. 1, the system 100 may be expanded by Including additional endpoint devices, access networks, and network elements without altering the present disclosure. Similarly, although various network elements are shown as discrete components, those skilled in the art will realize that one or more of such components may be consolidated into a lesser number of network elements and that functions described in connection with a particular network element may in fact be assigned to a different network element. For example, the CCE 114 and AS 112 may, in one example, comprise a single device. In another example, the functions of AS 112 and DB 115 may be implemented in BE 109 and/or BE 111 instead. In other words, the social telephony firewall service of the present disclosure may be implemented in a border element, e.g., in a signaling and/or media gateway, instead of in the AS 112, as illustrated. Various other system architectures and modifications of this nature are possible in accordance with the present disclosure, as will be appreciated by those skilled in the art.

Figure 2:
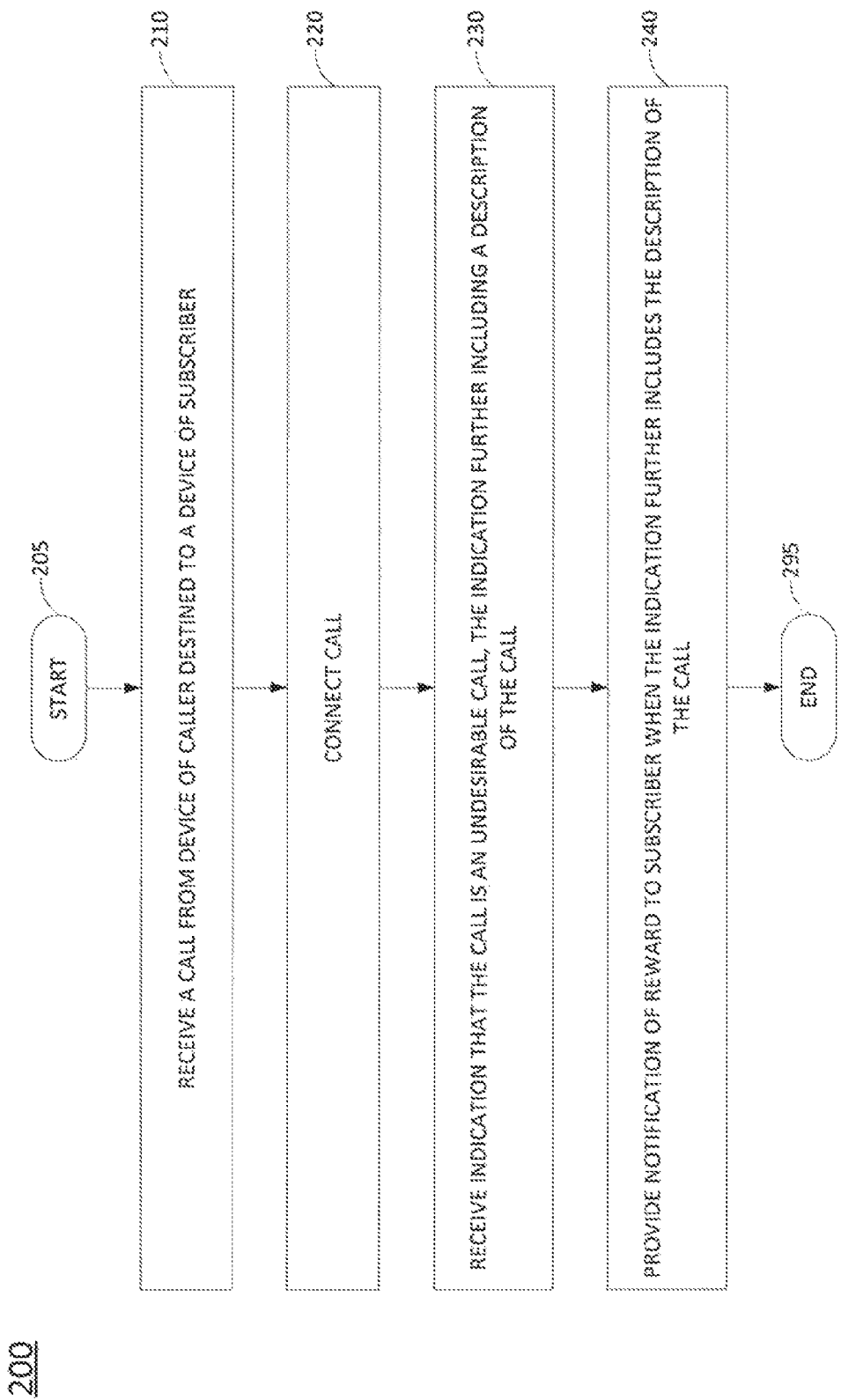
FIG. 2 illustrates a flowchart of a method for processing a call, according to the present disclosure.

To further aid in understanding the present disclosure, FIG. 2 illustrates a flowchart of a method 200 for processing a call. In an embodiment, the method 200 can be deployed in and/or performed by the application server for providing a social telephony firewall service. However, in other, further and different embodiments, the method 200 may be performed by one or more other devices, such as any one or more of the devices shown in system 100 of FIG. 1. In one embodiment, the method 200 is performed by a general purpose computing device having a processor, a memory and input/output devices as illustrated below in FIG. 5, specifically programmed to perform the steps, functions and/or operations of the method.

Method 200 starts in step 205 and proceeds to step 210.

In step 210, method 200 receives a call from a device of a caller destined to a device of a subscriber via a communication network. For example, the method 200 may receive a call setup signaling message for the device of the subscriber forwarded from an access network to the communication network.

In step 220, the method 200 connects the call to the device of the subscriber. For example, the method may consult a social telephony firewall service profile of the subscriber. If the device of the caller does not fall within any filtering rules of the subscriber, the method 200 may simply allow normal call signaling and setup to proceed to allow the call to be established between the device of the caller and the device of the subscriber.

At step 230, the method 200 receives an indication that the call is an undesirable call. For example, the subscriber may dial a predetermined sequence e.g., "*99", in order to signal to the method 200 that the subscriber is tagging the call as an undesirable call. In another embodiment the subscriber may signal a desire to tag the call using a voice command. For example, the method 200 may recognize a voice command uttered by the subscriber as signaling a desire to tag the call.

At step 230, the method may also prompt the subscriber to provide a description of the call. For example, the method may prompt the subscriber to indicate a type of the call, a purpose of the call, a characteristic of the caller, scores/ratings of the caller with respect to one or more characteristics, and so forth. In response, the subscriber may then volunteer further information regarding the call. However, in another example, the subscriber may simply volunteer such information along with an indication that the call is an undesirable call, which is received by the method at step 230.

At step 240, the method 200 provides a notification of a reward to the subscriber when the indication received at step 230 includes a description of the call. For example, if the subscriber provides additional information beyond simply tagging the call as an undesirable call, the subscriber may be provided a reward such as a service credit with the communication network for a service provided by the communication network, e.g., conferencing service, a data plan service, or redeemable rewards points that can be used for purchasing items with a partner retailer and so forth. In one embodiment, the notification may comprises an automated voice call, a voice message, an email message, a text message, and so forth, depending upon the capabilities of the communication network and/or the preferences of the subscriber for receiving such notification. In one embodiment, the method 200 selects a level of reward to provide to the subscriber based upon the level of detail regarding the tagged call provided by the subscriber at step 230. In other words, the more information provided by the subscriber, the greater the reward will be selected for the subscriber and indicated in the notification that is sent at step 240.

Following step 240, the method 200 proceeds to step 295 where the method ends.

Figure 3:
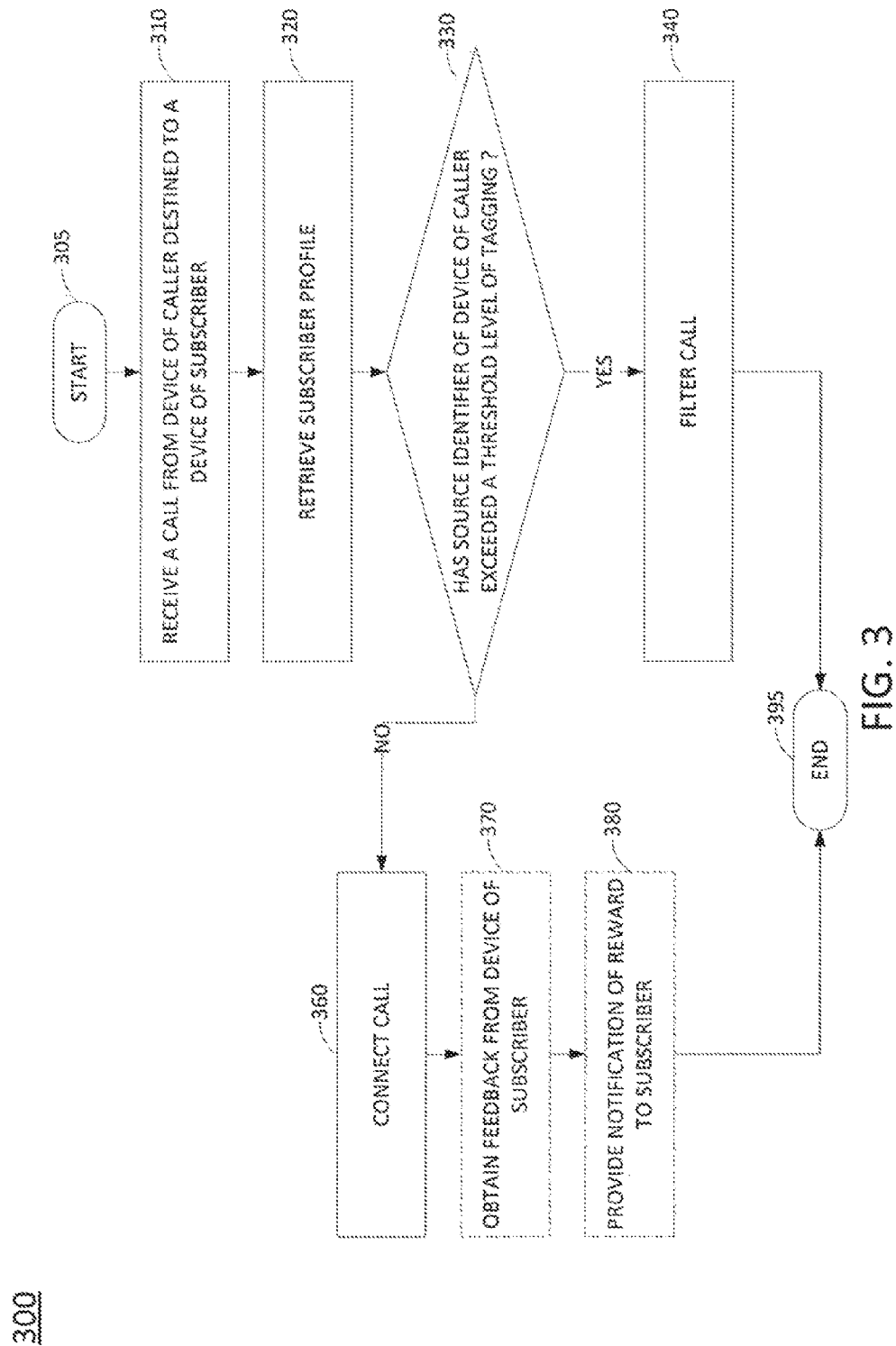
FIG. 3 illustrates a flowchart of a method for filtering a call, according to the present disclosure.

FIG. 3 illustrates a flowchart of a method 300 for filtering a call. In one embodiment, the method 300 can be deployed in and/or performed by an application server for providing a social telephony firewall service. However, in other, further and different embodiments, the method 300 may be performed by any one or more of the other devices shown in system 100 of FIG. 1, e.g., a call control element, a border element, and so forth. In one embodiment, the method 300 is performed by a general purpose computing device having a processor, a memory and input/output devices as illustrated below in FIG. 5, specifically programmed to perform the steps, functions and/or operations of the method.

Method 300 starts in step 305 and proceeds to step 310.

In step 310, method 300 receives a call from a device of a caller destined to a device of a subscriber via a communication network. For example, the method 300 may receive a call setup signaling message for the device of the subscriber forwarded from an access network to the communication network.

In step 320, method 300 retrieves a subscriber profile associated with the subscriber and/or the device of the subscriber. For example, the device of the subscriber may be identified based upon call destination/recipient information in the call setup signaling message. The profile may include filtering rules determined by the subscriber which set one or more thresholds with respect to a level of tagging of callers that dictates when a call from a device of caller should be filtered for alternative call handling. For example, one filtering rule may specify that calls be blocked from all callers who have been tagged more than a threshold, e.g., 50 times. In one embodiment, the subscriber may also configure the profile to vary various thresholds and preferences depending upon the time of day, certain categories of callers, and so forth.

The subscriber profile may also specify certain rules regarding the weights to apply to tags of other subscribers. For example, the subscriber may set a threshold of "100" for blocking calls from undesirable callers. In one example, 80 subscribers may have already tagged calls originating from a particular calling device as being a source of undesirable calls. Using a raw count, this particular calling device has not yet exceeded the subscriber defined threshold of 100. However, the subscriber may further specify that tags of contacts (e.g., friends and family) of the subscriber should be given a weight of "5". Thus, if five of the 80 subscribers who have tagged the calling device are also contacts of the subscriber, the overall weighted score may be recalculated as (75+(5×5)=100). In this scenario, the calling device does satisfy the threshold of 100 and the call is subject to blocking or other alternative call handling as specified in the subscriber profile. In a similar example, greater weight may be afforded to tags from other "valued" tagging subscribers in the social telephony firewall service. The weightings may be applied by default or may be specified by the subscriber as part of his/her individual profile. It should be noted that the method 300 may determine which subscribers are contacts using any presently available techniques. For instance, the method may simply look at a contact list of the subscriber stored on the device of the subscriber or in a subscriber profile stored within the communication network. In another example, the method may have access to social network profile information regarding the subscriber and his or her contacts via the social network. For example, the method may access such information via a social network gateway (SNG) between the communication network and the social network.

At step 330, the method 300 determines whether the device of the caller has exceeded a threshold level of tagging by other subscribers of the communication network. In one embodiment, step 330 includes comparing the stored information regarding the device of the caller against one or more of the filtering rules in the subscriber profile of the called subscriber retrieved at step 320 to determine whether the device of the caller exceeds a threshold level of tagging. For instance, as described above a count of a number of tags of a particular device of a caller may be maintained. In addition to a count of a number of tags relating to the caller/calling device being identified a source of an undesirable call, additional information may be available such as a count of the number of times the caller has been tagged as being a particular type of caller, e.g., a telemarketer, a charity, a survey entity, a political organization, etc., more detailed category information, e.g., timeshare sales, insurance sales, car sales, and the like, as well as average scores of the caller across different characteristics categories, e.g., rudeness, aggressiveness, persistence, and so on. In other words, step 330 may comprise the application of different thresholds to different types of aggregate information available regarding the device of the caller, e.g., type of call information, purpose of call information, and caller characteristics information.

In one embodiment, at step 330 the method 300 applies weightings to various tags prior to determining whether the calling device satisfies a threshold of one or more filtering rules contained in the subscriber profile. For instance, step 330 may involve applying weights to one or more of the tags depending upon which subscriber provided the tag, e.g., a subscriber with a higher level of participation in the social telephony firewall service, another subscriber who is a contact of the called subscriber, and so forth.

If at step 330, the method 300 determines that the calling device satisfies one or more thresholds regarding a level of tagging, the method proceeds to step 340 where the method filters the call. For example, if there are multiple thresholds specified in the filtering rules of the subscriber profile, depending upon which threshold has been met, the method may implement a particular call handling as specified in the associated filtering rule. For example, a filtering rule may specify a threshold of 50 tags of a calling device as being a source of undesirable calls. The filtering rule may further specify that when a call is received from a calling device that satisfies this threshold, the call should be rerouted to a voicemail server. The voicemail server may play a prerecorded announcement for the caller prior to allowing the caller to leave a voice message for the subscriber. In another example, the filtering rule may specify that that the call should be blocked, dropped, routed to another endpoint device, and so forth. In another example, the filtering rule may specify that a notification message should be sent back to the calling device indicating that the call has been blocked, dropped, rerouted, and so forth.

If at step 330, the method determines that the device of the caller does not satisfy any threshold(s) of any filtering rules defined by the subscriber in the subscriber profile, the method proceeds to step 360.

At step 360, the method connects the call to the device of the subscriber. For example, the method 300 may implement normal call processing/routing to establish the call.

At optional step 370, the method 300 obtains feedback from the device of the subscriber following the call. For example, step 370 may involve the same or similar functions to those described above in connection with step 230 of FIG. 2.

At optional step 380, the method 300 provides a notification of a reward to the subscriber, e.g., when the subscriber provides a more detailed description regarding the call at step 370. Notably, step 380 may comprise the same or similar functions to those described above in connection with step 240 of FIG. 2.

Following any of steps 340, 360, 370 or 380, the method 300 proceeds to step 395 where the method ends.

Figure 4:
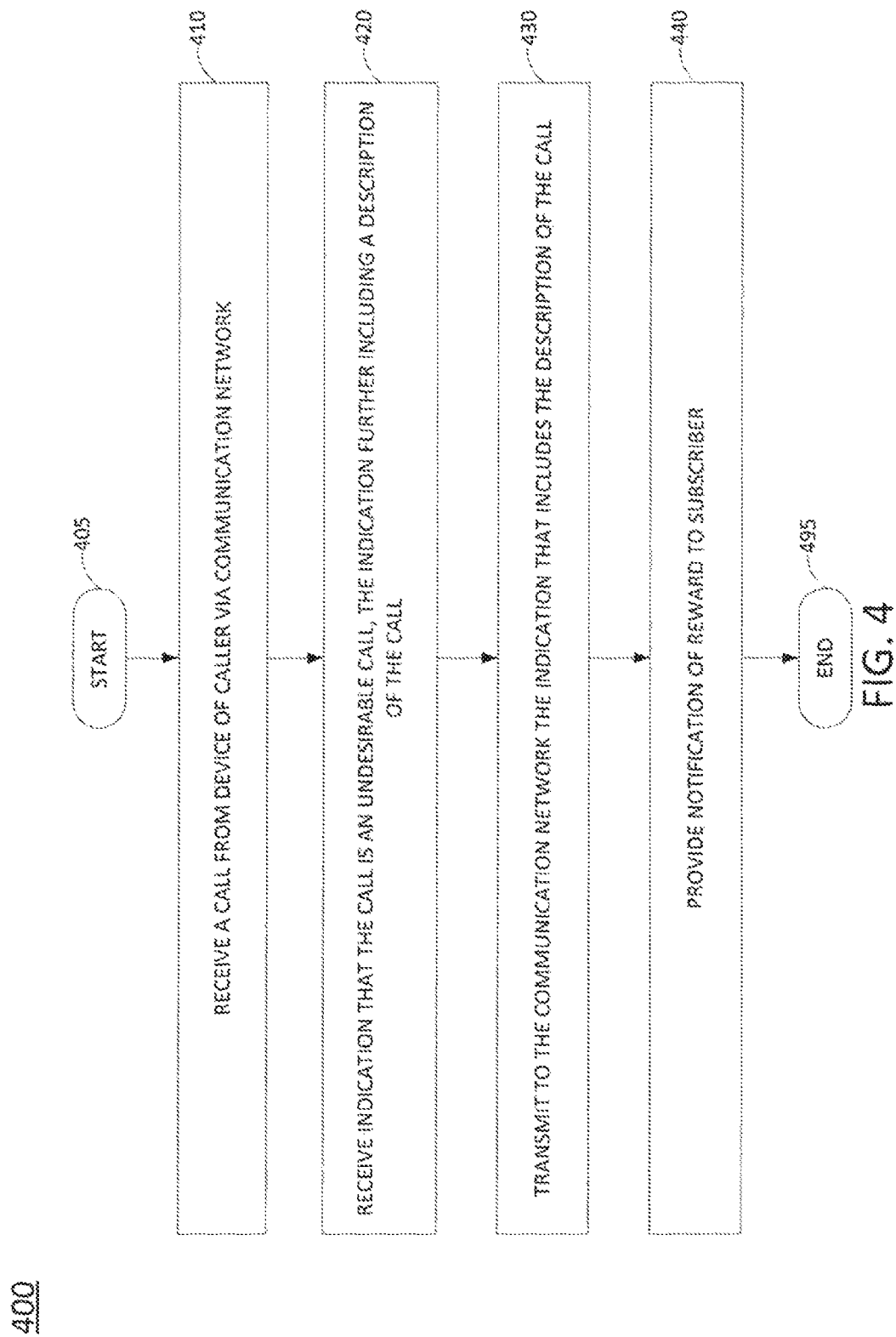
FIG. 4 illustrates a flowchart of a further method for processing a call, according to the present disclosure.

FIG. 4 illustrates a flowchart of a method 400 for processing call. In one embodiment, the method 400 can be deployed in and/or performed by an endpoint device of a subscriber, e.g., a wired or wireless telephone, a softphone, a terminal adapter, a cellular phone, and so forth. Alternatively, one or more steps, operations or functions of the method 400 may be implemented by a general purpose computer having a processor, a memory and input/output devices as illustrated below in FIG. 5, specifically programmed to perform the steps, functions and/or operations of the method.

Method 400 starts in step 405 and proceeds to step 410. In step 410, the method 400 receives a call for a subscriber from a device of a caller via a communication network. For example, the subscriber may be a subscriber/customer of the communication network.

At step 420, the method 400 receives an indication that the call is an undesirable call. In one example, the method 400 may prompt the subscriber at the end of the call to indicate whether the call was an undesirable call. Alternatively, step 420 may comprise receiving a subscriber input during or after the call to indicate that the call is an undesirable call. For example, as described above in connection with step 230 of FIG. 2, the subscriber may provide a voice command or enter a predetermined sequence of keys/tones to indicate a desire to tag the call as an undesirable call. In one example, the indication that the call is an undesirable call further includes a description of the call. The description of the call may comprise a type of call, a purpose of the call, characteristics of the caller, and so forth.

At step 430, the method 400 transmits the indication that the call is an undesirable call to the communication network. For example, the method 400 may transmit the indication to an application server in the communication network that implements a social telephony firewall service in accordance with the present disclose. In one example, the indication further includes the description of the call obtained at step 420. In one example, the indication that the call is an undesirable call comprises a tag that is forwarded to the communication network. The tag may be aggregated with other tags pertaining to the same caller/source identifier of the calling device for use in subsequent call blocking, call rerouting, and other call treatment according to subscriber profiles of other subscribers.

At step 440, the method 400 provides a notification of a reward to the subscriber. In one example, the method 400 receives a notification of the reward from the communication network and passes the notification to the subscriber. For example, the method may display a text message or play an audio recording, depending upon the format of the notification received from the communication network and/or the playback preferences of the subscriber.

Following step 440, the method 400 proceeds to step 495 where the method ends.

In addition, although not specifically specified, one or more steps, functions or operations of the respective methods 200, 300 and 400 may include a storing, displaying and/or outputting step as required for a particular application. In other words, any data, records, fields, and/or intermediate results discussed in the methods can be stored, displayed and/or outputted either on the device executing the methods 200, 300 or 400, or to another device, as required for a particular application.

Furthermore, steps, blocks, functions or operations in FIGS. 2-4 that recite a determining operation or involve a decision do not necessarily require that both branches of the determining operation be practiced. In other words, one of the branches of the determining operation can be deemed as an optional step. Furthermore, steps, blocks, functions or operations of the above described methods can be combined, separated, and/or performed in a different order from that described above, without departing from the example embodiments of the present disclosure.

FIG. 5 depicts a high-level block diagram of a general-purpose computer suitable for use in performing the functions described herein. As depicted in FIG. 5, the system 500 comprises a hardware processor element 502 (e.g., a central processing unit (CPU) or a microprocessor), a memory 504, e.g., random access memory (RAM) and/or read only memory (ROM), a module 505 for providing a social telephony firewall service, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)).

It should be noted that the present disclosure can be implemented in software and/or in a combination of software and hardware, e.g., using application specific integrated circuits (ASIC), a general purpose computer or any other hardware equivalents. In one embodiment, instructions and data for the present module or process 505 for providing a social telephony firewall service can be loaded into memory 504 and executed by processor 502 to implement the steps, functions or operations as discussed above in connection with the exemplary methods 200, 300 and 400. The processor executing the computer readable or software instructions relating to the above described method(s) can be perceived as a programmed processor or a specialized processor. As such, the present module 505 for providing a social telephony firewall service (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call, the method comprising:
receiving, by a processor of a device of a subscriber of a communication network, the call from a device of a caller via the communication network;
obtaining, by the processor, an indication that the call is an undesirable call, wherein the indication further includes a description of the call, wherein the description of the call comprises at least one of: a purpose of the call or a characteristic of the caller;
transmitting, by the processor, to the communication network the indication that includes the description of the call; and
receiving, by the processor, from the communication network a notification of a reward to the subscriber in response to the transmitting to the communication network the indication that includes the description of the call.

2. The method of claim 1, wherein the call is received by the processor when a source identifier of the device of the caller has not been tagged greater than a threshold number of times as being a source of undesirable calls.

3. The method of claim 2, wherein the threshold is determined by the subscriber.

4. The method of claim 1, wherein the description of the call further comprises an identification of a category of the caller.

5. The method of claim 4, wherein the category of the caller is selected from one of:
- a telemarketer;
- a political organization;
- a charity; and
- a survey organization.

6. The method of claim 1, wherein the reward comprises a service credit.

7. The method of claim 1, wherein the reward comprises a reward point.

8. A non-transitory computer readable medium storing a plurality of instructions which, when executed by a processor of a device of a subscriber of a communication network, cause the processor to perform operations for processing a call, the operations comprising:
- receiving the call from a device of a caller via the communication network;
- obtaining an indication that the call is an undesirable call, wherein the indication further includes a description of the call, wherein the description of the call comprises at least one of: a purpose of the call or a characteristic of the caller;
- transmitting to the communication network the indication that includes the description of the call; and
- receiving from the communication network a notification of a reward to the subscriber in response to the transmitting to the communication network the indication that includes the description of the call.

9. The non-transitory computer readable medium of claim 8, wherein the call is received by the processor when a source identifier of the device of the caller has not been tagged greater than a threshold number of times as being a source of undesirable calls.

10. The non-transitory computer readable medium of claim 9, wherein the threshold is determined by the subscriber.

11. The non-transitory computer readable medium of claim 8, wherein the description of the call further comprises an identification of a category of the caller.

12. The non-transitory computer readable medium of claim 11, wherein the category of the caller is selected from one of:
- a telemarketer;
- a political organization;
- a charity; and
- a survey organization.

13. The non-transitory computer readable medium of claim 8, wherein the reward comprises a service credit.

14. The non-transitory computer readable medium of claim 8, wherein the reward comprises a reward point.

15. A device of a subscriber of a communication network for processing a call, the device comprising:
- a processor; and
- a computer readable medium storing a plurality of instructions which, when executed by the processor, cause the processor to perform operations, the operations comprising:
  - receiving the call from a device of a caller via the communication network;
  - obtaining an indication that the call is an undesirable call, wherein the indication further includes a description of the call, wherein the description of the call comprises at least one of: a purpose of the call or a characteristic of the caller;
  - transmitting to the communication network the indication that includes the description of the call; and
  - receiving from the communication network a notification of a reward to the subscriber in response to the transmitting to the communication network the indication that includes the description of the call.

16. The device of claim 15, wherein the call is received by the processor when a source identifier of the device of the caller has not been tagged greater than a threshold number of times as being a source of undesirable calls.

17. The device of claim 16, wherein the threshold is determined by the subscriber.

18. The device of claim 15, wherein the description of the call further comprises an identification of a category of the caller.

19. The device of claim 18, wherein the category of the caller is selected from one of:
- a telemarketer;
- a political organization;
- a charity; and
- a survey organization.

20. The device of claim 15, wherein the reward comprises a service credit or a reward point.

* * * * *